L. Reynolds.

Grain Meter.

N°. 86,181.    Patented Dec. 22, 1868.

Witnesses.
S. C. Kemon
C. A. Pettit

Inventor.
L. Reynolds
By Munn & Co
Attorneys

United States Patent Office.

LESTER REYNOLDS, OF OWATONNA, MINNESOTA.

Letters Patent No. 85,181, dated December 22, 1868.

---

IMPROVEMENT IN GRAIN-WEIGHING AND REGISTERING MACHINE.

---

The Schedule referred to in these Letters Patent and making part of the same.

---

*To all whom it may concern:*

Be it known that I, LESTER REYNOLDS, of Owatonna, in the county of Steele, and State of Minnesota, have invented a new and improved Machine for Weighing and Measuring Grain; and I do hereby declare that the following is a full, clear, and exact description of the construction and operation of the same, reference being had to the accompanying drawings, making a part of this specification, in which—

Figure 2:
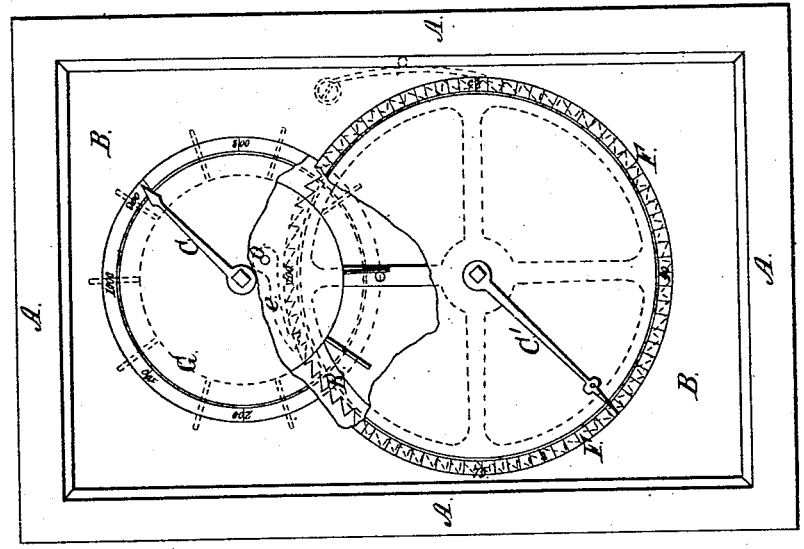
Figure 2 is a front view.

This invention is a simple, cheap, and durable apparatus for automatically weighing and measuring grain, and registering the quantity thereof.

In the drawings—

A indicates the case or box which encloses and protects the working-parts, and which is provided on its front side with a glass door, B, through which the movements of the registering-index C can be seen, and the quantity of grain that has been measured can be accurately determined at a glance.

At the top of the case is a hopper, E, into which the grain is poured, and from which it descends through a double guide, D D', to a double measure, M M', in which it is weighed, and from which it is discharged into bags below.

The walls of the measures M M', and the division-plate or wall m between them, are rigidly affixed to the case A.

Figure 1:
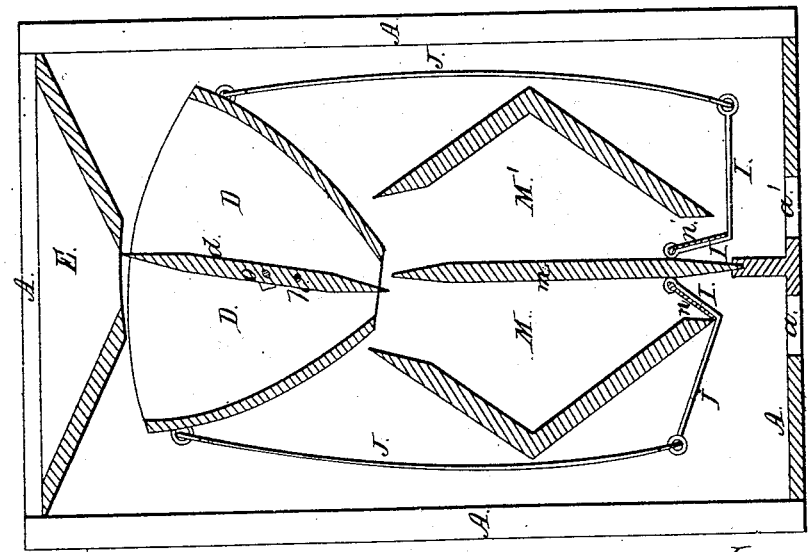
Figure 1 is a longitudinal vertical section.

The double guide-spout D D', with the dividing-plate or wall d between the two channels or funnels thereof, swings on a pivot, p, and is so adjusted that when its top is swung to the right, as seen in fig. 1, the grain runs from the hopper into the funnel D, and thence to the measure M, but when swung to the left, the grain runs from the hopper into the funnel D', and thence into the measure M'.

The bottom of each measure is closed by a valve or door, n or n'. An arm, I, is connected with the valve, or so attached to the apparatus that the valve rests upon it, and extends out towards the side walls of the case, where a vertical rod, J, is hinged to it, the upper end of the vertical rod being hinged to the side of the tilting-guide D D'.

By reason of this arrangement, whenever the guide D D' is tipped to the right, so as to discharge the grain into the left-hand measure M, the valve n, under the left-hand measure, will be closed, and the measure will retain all the grain that is poured into it, while the valve n', under the other measure, is open, and when the guide is turned to the left, the valve n' will be closed, and the valve n opened.

The apparatus is then so adjusted, that when a certain quantity of grain has accumulated in either measure, say half a bushel, the weight of such grain, pressing down on the valve n or n', will open the valve, force the arm I down, and thereby turn the guide D D' on its pivot, causing the grain to run from the hopper into the other measure, while the rod J, on the side of the other measure, being actuated by the tipping of the guide-box D D', will close the valve under that measure.

When that measure is full, the operation will be repeated, in the reverse direction, of course, and thus alternately each measure will be filled and emptied.

As soon as the valve n or n' is open, the grain will be discharged at once, through the apertures a a', into the bag.

The operator can tie and remove one bag, and place another, while the other measure is filling.

The registering-apparatus is the perfection of simplicity and accuracy, consisting of a graduated dial, G, an index-hand, C, to show the hundreds of bushels, and another dial, F, and index-hand C', to shown the units.

The dial G is graduated into ten degrees, and the other into one hundred, and the index C, or its spindle, at every revolution, causes the index C to move one degree on its own dial.

The shaft or spindle of the index C' has, behind the dial-plate, a ratchet-wheel, R, fixed to it, which is operated by a reciprocating hook or pawl, e.

The pawl is pivoted on a pin, o, projecting from the partition d, through a slot in the inner lining of the case A.

As each half-bushel measure is filled, the partition d rocks on its pivot p, and moves the pin o back and forth, and with it the pawl e.

When the pawl moves to the left, as seen in fig. 1, it does not operate the ratchet R, but when it moves to the right its barb catches in the spurs of the wheel, and turns the ratchet one step, which the hand C' immediately registers as one degree.

Thus only every alternate movement of the guide D D' is registered, so that the measures M M', being adjusted to weigh and measure half bushels, the index C' will record bushels, and the index C, hundreds of bushels.

Another index might be added, if necessary, constructed on the same plan, to record thousands of bushels.

Having thus described my invention,

What I claim as new, and desire to secure by Letters Patent, is—

The arrangement of the measures M M', pivoted guide D D', hopper E, valves n n', and arms I and J, for connecting the valves to the sides of the pivoted guides, substantially as shown and described.

LESTER REYNOLDS.

Witnesses:
LEWIS L. WHEELOCK,
A. M. KINYON.